US009250650B2

(12) United States Patent
Myerchin

(10) Patent No.: US 9,250,650 B2
(45) Date of Patent: Feb. 2, 2016

(54) FOOT SUPPORT ASSEMBLY FOR CANTILEVERED TOUCH SCREEN

(71) Applicant: Myerchin Enterprises, Inc., Bellevue, WA (US)

(72) Inventor: Christian P. Myerchin, Bellevue, WA (US)

(73) Assignee: Myerchin Enterprises, Inc., Bellevue, WA (US)

( * ) Notice: Subject to any disclaimer, the term of this patent is extended or adjusted under 35 U.S.C. 154(b) by 93 days.

(21) Appl. No.: 14/260,804

(22) Filed: Apr. 24, 2014

(65) Prior Publication Data

US 2014/0328012 A1    Nov. 6, 2014

Related U.S. Application Data

(60) Provisional application No. 61/818,180, filed on May 1, 2013.

(51) Int. Cl.
*G06F 1/16*    (2006.01)
(52) U.S. Cl.
CPC ............... *G06F 1/16* (2013.01); *G06F 1/1601* (2013.01); *Y10T 29/49826* (2015.01)
(58) Field of Classification Search
USPC ............ 312/223.1, 223.2, 223.3; 361/679.15, 361/679.27, 679.01, 679.09, 679.22, 361/679.06, 679.12, 679.26, 679.21, 361/679.07, 679.58, 679.31, 679.04, 361/679.05, 679.3; 435/286.2, 286.1, 435/287.2; 248/125.1, 122.1, 121, 434, 248/188.6, 425, 159, 276.1, 674, 604, 917, 248/274.1, 278.1
See application file for complete search history.

(56) References Cited

U.S. PATENT DOCUMENTS

| 5,302,970 | A  | * | 4/1994  | Lakso et al. | ................ 345/168 |
| 6,430,037 | B1 | * | 8/2002  | Oba et al.   | ................ 361/679.15 |
| 2008/0291615 | A1 | * | 11/2008 | Sakata et al. | ................ 361/681 |

* cited by examiner

*Primary Examiner* — Hung Duong
(74) *Attorney, Agent, or Firm* — AEON Law; Adam L. K. Philipp

(57) ABSTRACT

A computer *display is pivotally connected to at least one *display arm, which in turn is pivotally connected to a base. When the *display arm(s) points upward from the base, the *display may hang in a vertical position. When the *display arm is lowered a torque is exerted on the *display to tilt the *display away from the base. When the *display reaches a *horizontal position an open space will exist under the *display that can be used to place items such as a mouse, keyboard, notepad, pens or other low profile devices. One or more feet are attached to the *display such that that when the *display is in the horizontal position the foot or feet contact a stable surface such as a desk, table or other suitably stable object, and further provides for such open space.

20 Claims, 7 Drawing Sheets

FOOT SUPPORT ASSEMBLY FOR CANTILEVERED TOUCH SCREEN

CROSS-REFERENCE TO RELATED APPLICATIONS

This application claims the benefit of U.S. Provisional Application Ser. No. 61/818,180 filed on May 1, 2013, entitled "Foot Support Assembly For Cantilevered Touch Screen," the benefit of the earlier filing date of which is hereby claimed under 35 U.S.C. §119 (e) and further incorporated by reference in its entirety.

TECHNICAL INVENTION

Various embodiments relate generally to computer display mounting devices and more particularly, but not exclusively to a foot support assembly that is useable for displays, such as touch screen displays, where the display is tilted away from a central mounting point and held in a cantilevered position, such that the foot is used to support and or elevate the display.

BACKGROUND

Electronic displays with data input capability may be considered as having two distinct usage modes. One usage mode is for information display, while a second usage mode is where a touch screen interaction and display are provided simultaneously. In the first usage mode, the typical computer display involves a standard computer monitor, with an ergonomic design that encourages the display to be at a typical arm's length away from a user and at or slightly below eye level, where a mouse and keyboard are the primary means of user input. However, this position may not be ideal for the second usage mode where touching the screen is intended as a primary method of input. For the second usage mode, the display is often placed closer to the user, lower and in a more horizontal position near the area where the mouse and keyboard are traditionally placed. This can be accomplished by placing the display at the end of an arm and pivoting the arm from an elevated position to a lower position. When in the lower position the display can extend over the keyboard placing it in a cantilevered position at the end of the pivoting arm. When the display is so extended touch input from a user imparts significant strain on the cantilever assembly. The actions of supporting the display in the lower horizontal position are among the considerations, that embodiments of the present invention have been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1A:
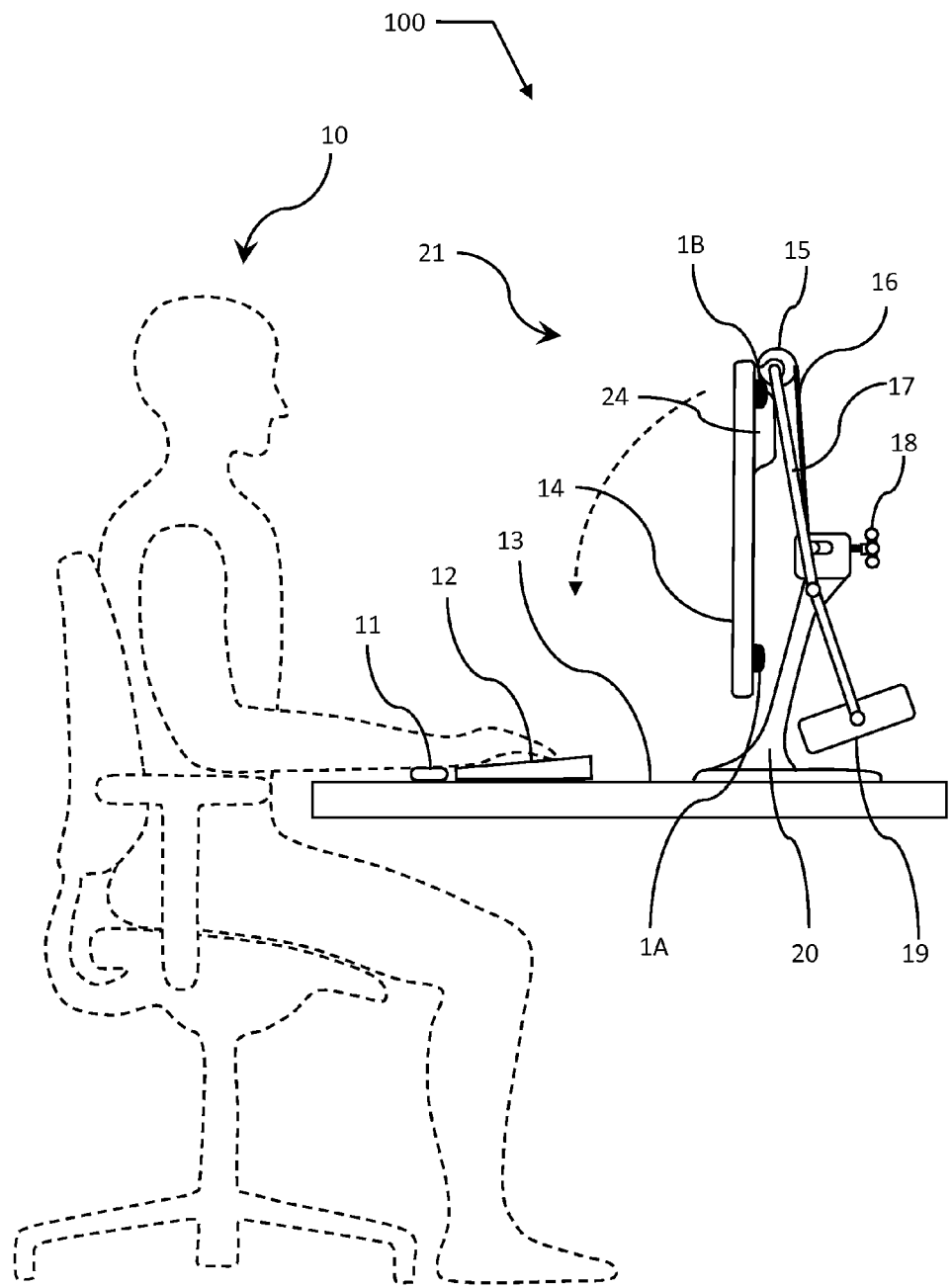
FIGS. 1A-1D illustrate perspective views of one embodiment of a cam rotated display with a folding foot support.

Embodiments now will be described more fully hereinafter with reference to the accompanying drawings, which form a part hereof, and which show, by way of illustration, specific embodiments which may be practiced. This invention may, however, be embodied in many different forms and should not be construed as limited to the embodiments set forth herein; rather, these embodiments are provided so that this disclosure will be thorough and complete, and will fully convey the scope to those skilled in the art. The following detailed description is, therefore, not to be taken in a limiting sense.

Throughout the specification and claims, the following terms take the meanings explicitly associated herein, unless the context clearly dictates otherwise. References to "one embodiment," "an embodiment," "another embodiment," as used herein indicates that a particular feature, structure, or characteristic described in connection with the embodiment is included in at least one embodiment. However, the phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in." includes "in" and "on."

In addition, as used herein, the term "display" is equivalent to the term "display and/or display holder," and refers to a situation where either item or both items can be used. The term is used to aid in readability as this is a commonly referred to term herein.

In addition, as used herein the term "vertical position" and "horizontal position" refer to the display position relative to the force of gravity. The screen is in vertical position when within ±45 degrees of alignment with gravity. The screen is in horizontal position when between ±45 degrees orthogonal to the alignment of gravity. The term is used to aid in readability as this is a commonly referred to term herein.

The following briefly describes the various embodiments in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated embodiments are directed towards a support footing assembly for use with a computer *display device, the footing having at least one member connected to a *display. The *display is pivotally connected to one end of an arm or arms the second end of the arm(s) are pivotally connected to a base. When the *display is in the *horizontal position the majority of the *display surface extends beyond the base below creating an open space under the *display. The footing may contact a surface in or adjacent to the area under the *display to aid in stabilizing and elevating the *display.

A computer *display is pivotally connected to at least one *display arm. The other end of the *display arm(s) are pivotally connected to a base. When the *display arm(s) points upward (perpendicular) from the base, the *display may hang in a *vertical position. In one embodiment, the *display may be connected to the base such that when the *display arm is lowered a torque is exerted on the *display to tilt the *display away from the base. When the *display reaches a *horizontal position an open space will exist under the *display. The open space occupies the area between the outer most edge of the *display relative to the base to the closest edge of the base under the *display. The open space under the *display can be used to place items such as a mouse, keyboard, notepad, pens or other low profile devices. One or more feet are attached to the *display such that that when the *display is in the *horizontal position the foot or feet contact a stable surface such as a desk, table or other suitably stable object. The foot or feet serve to stabilize the *display if the user touches the *display surface. The foot or feet can also elevate the *display in the *horizontal position such that items fit more easily under the *display.

PARTIAL LIST OF REFERENCE NUMERALS

1A—First Support Foot in Folded Position
1B—Second Support Foot in Folded Position
2—Foot in Folded Position
3—Foot Housing
4—Foot in Unfolded Position
4A—First Support Foot in Unfolded Position
4B—Second Support Foot in Unfolded Position
5—Folding Foot Pivot Point
6—Foot Integrated with Tablet Holder.
7—Sliding Foot
8—Foot Under Display
10—Person in Typing Position
11—Wrist Brace
12—Keyboard
13—Desk Top
14—Touch Display
15—Cam
16—Cable
17—Display Arm
18—Tilt Adjustment Screw
19—Counterweight
20—Display Base
21—Display In Vertical Position
22—Display In Tilted Horizontal Position
23—Display In Flat Horizontal Position
24—Display Mount
25—Person in Touch input Position
30—Horizontal Tilt Adjustment Screw
32—Vertical Tilt Adjustment Screw
33—Tablet in Vertical Position
34—Spring
35—Tilt Adjustment Arm
36—Display Arm
37—Tablet
38—Tablet Holder
39—Tablet in Horizontal Position
40—Display Base
50—Frictional Hinge
52—Telescoping Display Arm
53—Display Base
54—Adjustment Mechanism for Keyboard Height
55—Keyboard Tray
56—Wing Nut
57—Arrow to Direction of Foot Movement
60—Display
61—Brace to Display Base
62—Display Arm
63—Display Brace
64—Open Space
65—Non Open Space Under Display

ILLUSTRATIVE EMBODIMENTS

Each of the FIGURES discussed below may include many more or less components than those shown in the FIGURES. Moreover, not all the components may be required to practice various embodiments and variations in the arrangement and type of the components may be made. However, the components shown are sufficient to disclose various illustrative embodiments for practicing the present invention.

Figure 1B:
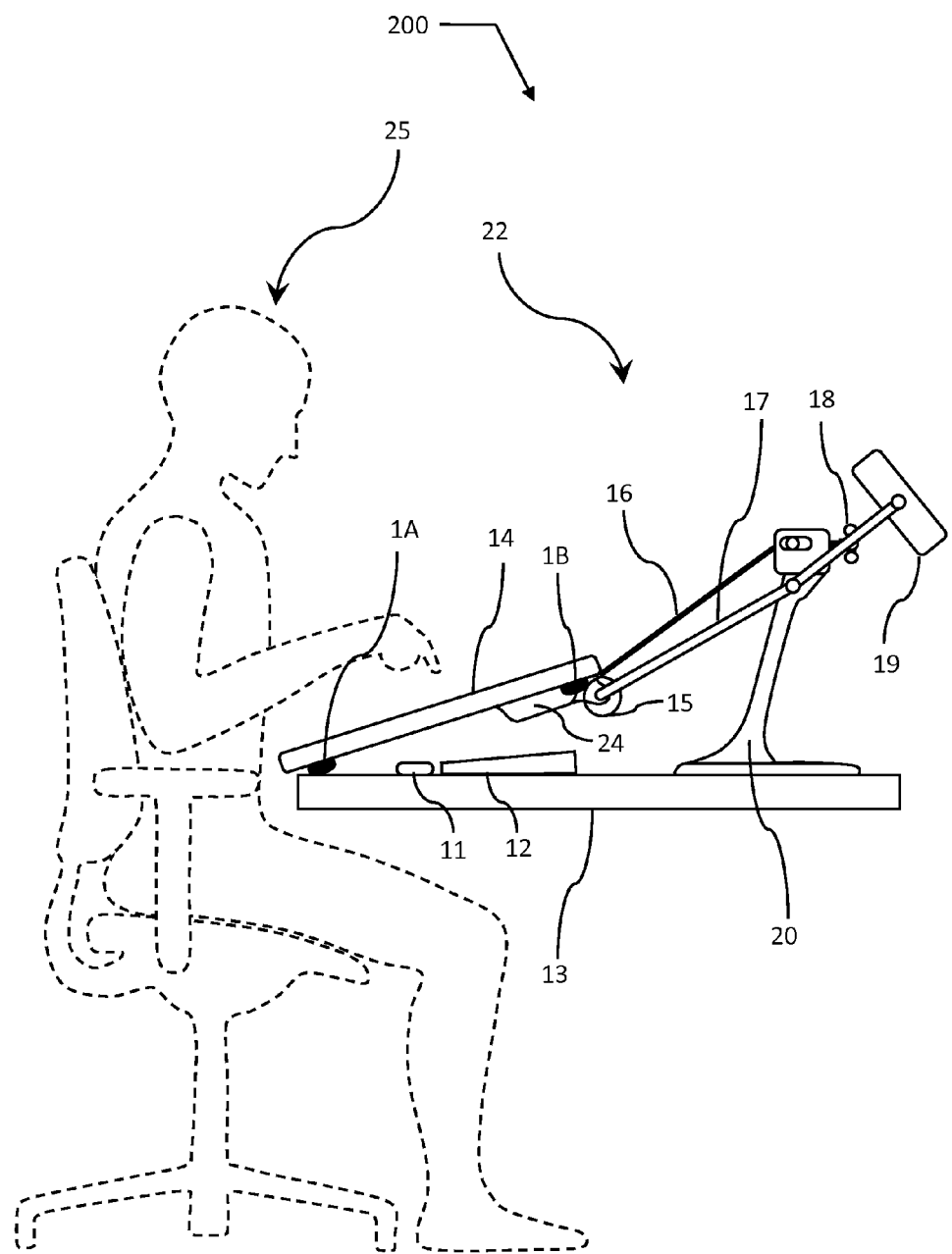
Figure 1C:
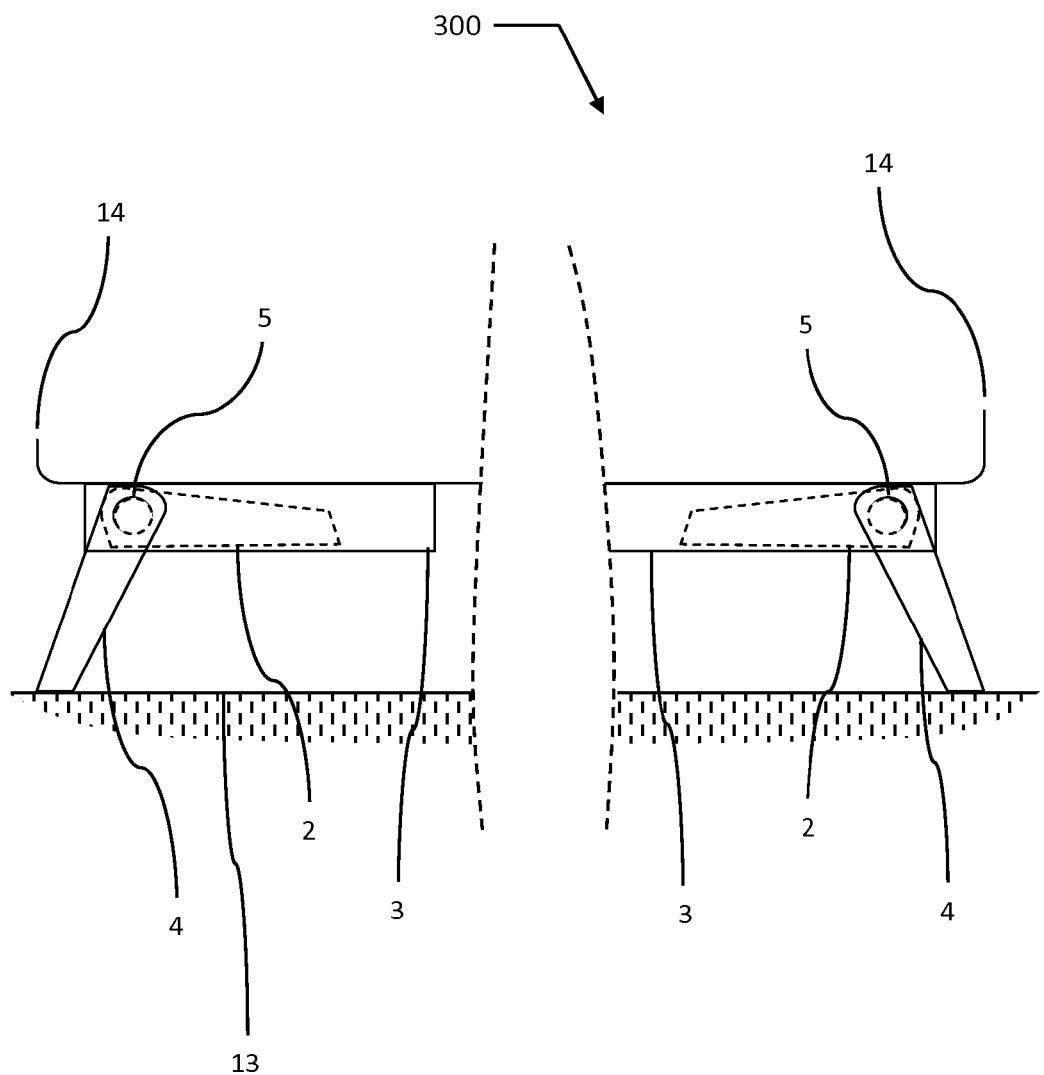
Figure 1D:
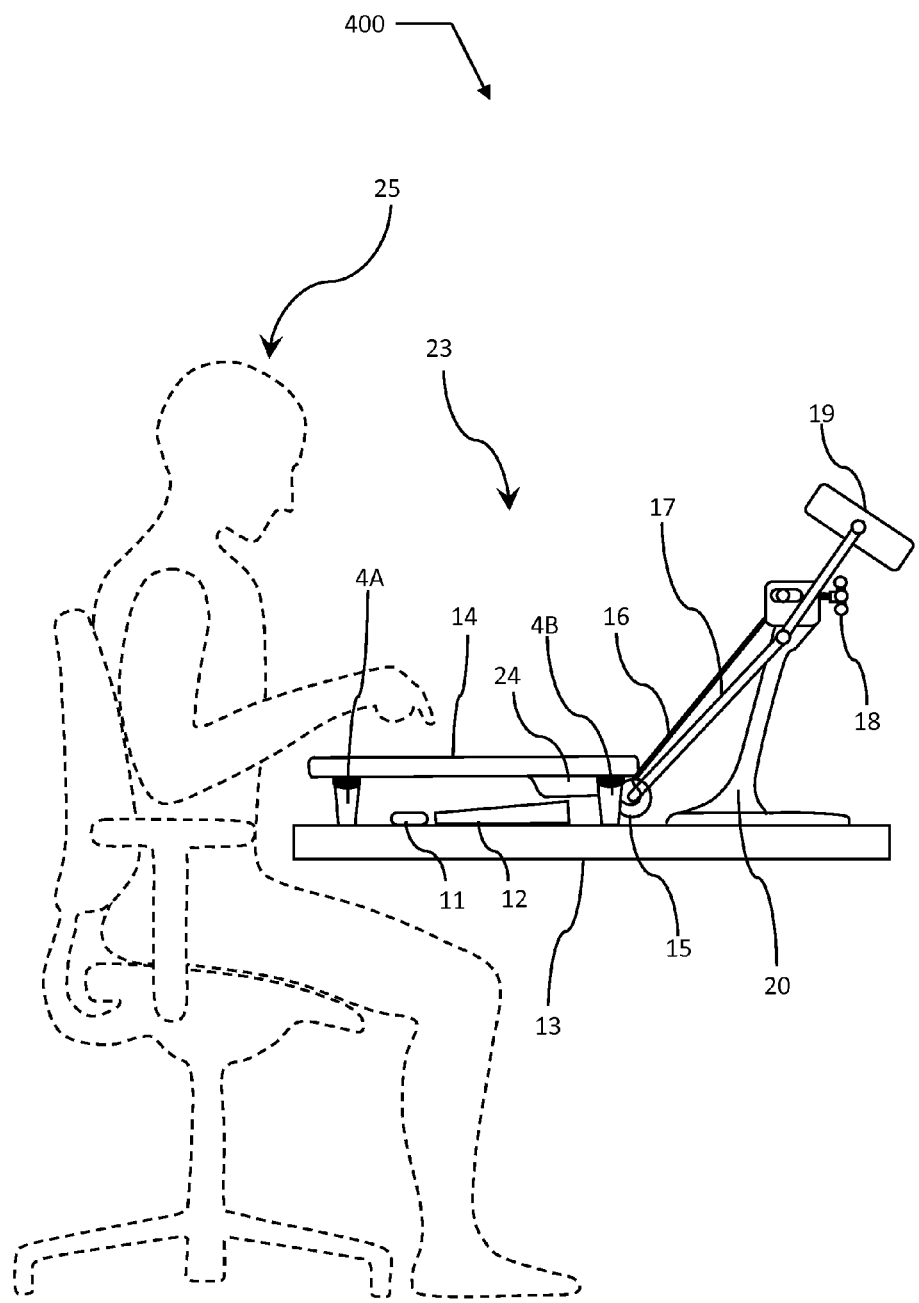

FIGS. 1A, 1B and 1D illustrate perspective views of one embodiment of a foot support system attached to a computer display in various angled positions. In one embodiment folding foot assemblies 1A and 1B are rigidly attached to display 14. Display mount 24 is rigidly attached to display 14. The display mount 24 is rigidly attached to cam 15. One or more display arms 17 are pivotally attached to display mount 24. Display arms 17 are pivotally attached base 20. The first end of cable 16 is attached to cam 15 and wraps cam 15. The second end of cable 16 attached tilt adjustment screw 18. Cam 15 is constructed such that cable 16 exerts a torque to rotate the cam 15, display mount 24, and display 14. Cable attachment point to tilt adjustment screw 18 is positioned such that as display arms 17 pivot downward (see FIG. 1A dashed arrow indicating direction of movement), the cable 16 will 'unwind' about cam 15, thereby pivoting display mount 24 and display 14 away from base 20. Tilt adjustment screw 18 is threaded into base 20. Tilt adjustment screw 18 adjusts the tilt of display 14 when in horizontal positions FIG. 1B, 22 and FIG. 1D, 23. Display arms 17 are rigidly attached to counterweight 19. Base 20 rests on desk 13 surface.

FIG. 1B shows display 14 in tilted horizontal position 22. Folded footing 1A is contacting desk 13. Footing 1A provides support such that movement of display 14 is minimized when user 25 touches display 14. Footing 1A elevates display 14 and display mount 24 such that there is room beneath display 14 for keyboard 14 or other items.

FIG. 1C illustrate perspective view of one embodiment of foot support system with folding support feet. The foot housing 3 contains folded foot 2 when in the folded position. The foot housing 3 can act as a support foot (as shown in FIG. 1B footing 1A). If a footing with greater elevation is required folded foot 2 may be pivoted about point 5 such that it stops in the unfolded foot 4 position. In one embodiment the foot housing 3 and folded foot 2 are mode of molded plastic with a rubber like slip resistant material in areas were contact with desk 13 is intended. In other embodiments the housing and foot may be made of metal, composites or any other material capable of proving sufficient support, the slip resistant material may omitted.

In one embodiment, folded foot 2 may be pivoted from foot housing 3 to unfolded position 4 by user prying footing loose from housing 3 then pivoting foot to unfolded position 4. In other embodiments, the footing may be press latch locked and pivoting action of foot 4 may be powered by spring.

FIG. 1D shows display 14 in a flat horizontal position 23 with feet 4A and 4B in unfolded position. Display 14 is elevated above keyboard 12 by feet 1A and 1B. Feet 1A and 1B stabilize display 14 from user 25 touch input.

In one embodiment, desk 13 is traditional office desk surface composed of a hard laminate over composite wood surface. However, desk 13 can comprise of any approximately horizontal surface capable holding display base. As shown in later embodiments the surface for supporting the footing assembly need not be a contiguous surface.

Display 14 can be virtually any computer monitor for providing an image to a user, including, but not limited to a liquid crystal display (LCD) device, OLED or the like. In one embodiment, display 14 may be a computer display device that is configured as a touch screen display that enables users to interact and provide inputs to a computing system by touching a screen of the display 14. Display 14 may provide any of a variety of mechanisms for attaching to display mount 24, including, but not limited to bolts, screws, hooks, pin connectors, or the like. For example, in one embodiment a screw element may be employed to attach display 14 to display mount 24. By employing such mechanisms, display 14 may be removed from display mount 24 and/or other display devices may be attached to display mount 24. However, in other embodiments, display 14 may be attached to display mount 24 to not be readily removable. For example, in one embodiment, display 14 may be glued, soldered, welded, or otherwise permanently attached to display mount 24.

In other embodiments, any or all the elements of display arm 17 pivot, horizontal tilt screw 18 and folded feet 4A,4B may be electro mechanically operated such that the user may be able to select pre-programmed display positions including but not limited to vertical FIG. 1A, 21, tilted horizontal FIG. 1B, 22, and flat horizontal FIG. 1D, 23.

In one embodiment, the pivoting connection point between the display 14 and the display arm 17 is located above the display 14 horizontal center as measured when the display 14 surface is parallel to a force of gravity; in the vertical position 21. That is, in one embodiment, the pivot point between a second end of the arm and the computer display device is located above the display device horizontal center as measured when the display device surface is parallel to the force of gravity. This maximizes the open space below display 14 when in the horizontal positions 22 and 23. The pivot point items such as the cam 15, the display mount 24 or the display arm(s) 17 occupy open space below the display 14 when horizontal. By locating the pivot point items above the display 14 mid point it provides adequate open space between pivot point members and footings 1A to store items like keyboard 12, wrist brace 11 or other low profile devices.

Illustrative Operations

The operation of certain aspects of the embodiments will now be described with respect to FIGS. 1A-1D. FIGS. 1A-1D illustrate perspective views of one embodiment of a foot support system attached to a computer display in various angled positions. FIG. 1A illustrates a vertical position 21 for the display 14; FIG. 1B illustrates a tilted horizontal position 22 for the display 14, and FIG. 1D shows a flat horizontal position 23. FIG. 1C illustrates a detailed view of folded feet and related component parts. It should be readily apparent to one of skill in the art that such illustrated positions are non-limiting, and other positions may be obtained when the computer display is rotated about the base, as described further below. Moreover, as stated elsewhere, not all components may be illustrated. For example, the display may be in a tiled horizontal position 22 and feet 4A may be unfolded creating more open space under the display.

In any event, when display 14 is in a vertical position 21, FIG. 1A, display 14 is in its highest elevation, relative to base 22. Again, FIG. 1A illustrates one embodiment of such vertical configuration.

As shown in FIGS. 1B,1D, as display arm 17 is lowered, such as being repositioned downwards towards desk 13 or the like, as display arm 17 is lowered, the cable 16 is positioned such that distance between screw 18 attachment point and tangent point of cable 16 to cam 15 will increase. This imparts a toque on cam 15 to pivot display mount 24 and display 14 away from base 20. When screw 18 is turned it moves the cable 16 attachment point at the end of the screw 18 along the axis of the screw 18 length. Screw 18 is positioned approximately perpendicular to display arm 17 when in the vertical position 24, thus when the cable 16 attachment point is moved relative to the screws axis of length it has very little effect on the display tilt in the vertical position FIG. 1A, 21 but has a much greater effect on horizontal titled position FIG. 1B, 22 and horizontal flat position FIG. 1D, 23.

As shown in FIG. 1B, when the display arm 17 lowers display 14 to the point where folded footing support 1A contacts the desk 13 this stops pivoting action of both display 14 and display arm 17. When folded footing support 1A is in contact with desk 13 and user 25 touches the display 14 a large portion of the downward force exerted on the display 14 is directed to fold footing support 1A. The folded footing support 1A may incorporate a non-skid surface such that any sliding movement caused by the user 25 touch of the display is resisted.

As shown in FIG. 1D, the horizontal tilt screw 18 may be adjusted such that display 14 is pivoted to reach a flat horizontal position 23. The support feet 4a and 4b are unfolded by user 25 such the display is fully supported by feet 4a and 4b.

Alternative Embodiments

Figure 2:
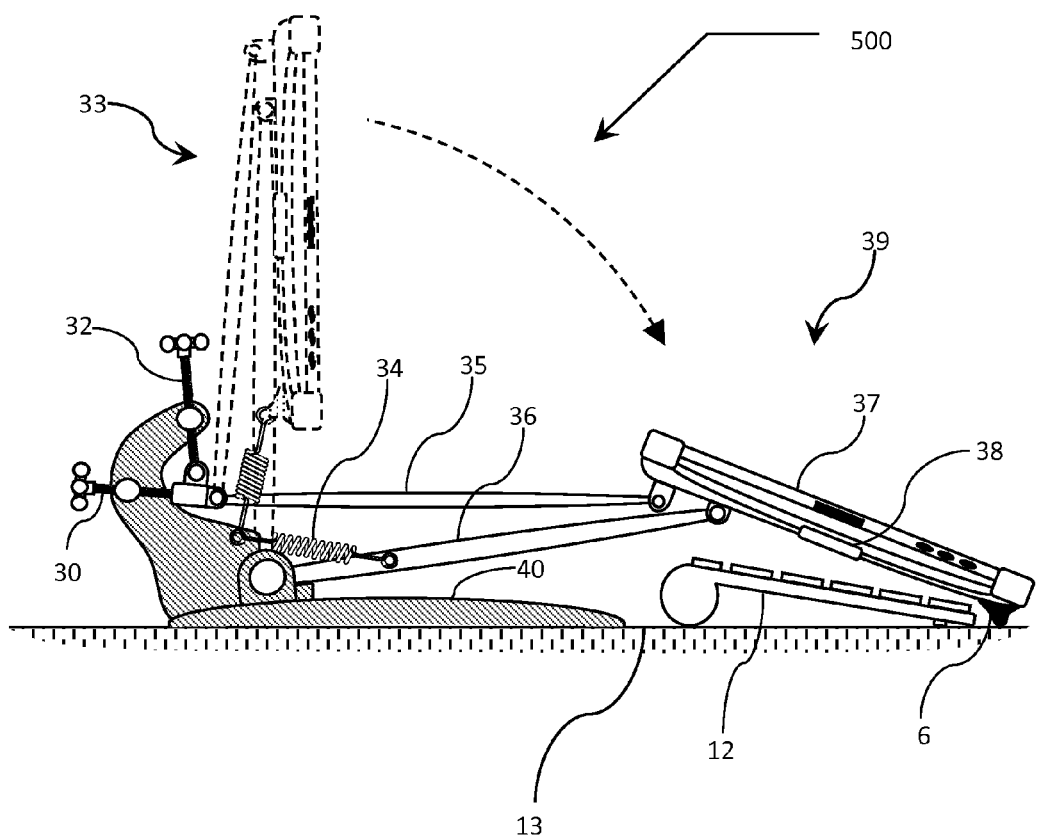
FIG. 2 illustrates a second perspective view of one embodiment of a two arm rotated tablet display with a foot integrated into tablet holder.

Other embodiments are also envisaged. For example, FIG. 2 illustrates one embodiment of a perspective view of a footing support with tablet display. The first ends of display arms 35 and 36 are both pivotally connected to display holder 38. The second end of display arm 36 is pivotally connected to base 40. The second end of display arm 35 is pivotally connected to tilt adjustment screws 30 and 32. The arrangement and length of display arms 35 and 36 will cause display mount 38 to pivot away from the base 40 when lowered from vertical position 33 the horizontal position 39. In one embodiment a detachable tablet computer 37 may be placed in the display holder 38 in other embodiments a display may be permanently attached to display mount 38.

In one embodiment of FIG. 2 support footing 6 is permanently attached display mount 38. In other embodiments footing 6 may be detached and re-attached to a different location on display mount 38. The removable footing may be attached by glues, suction cups, hook-and-loop fasteners or any other means of rigid connection that is removable and re-attachable.

Figure 3:
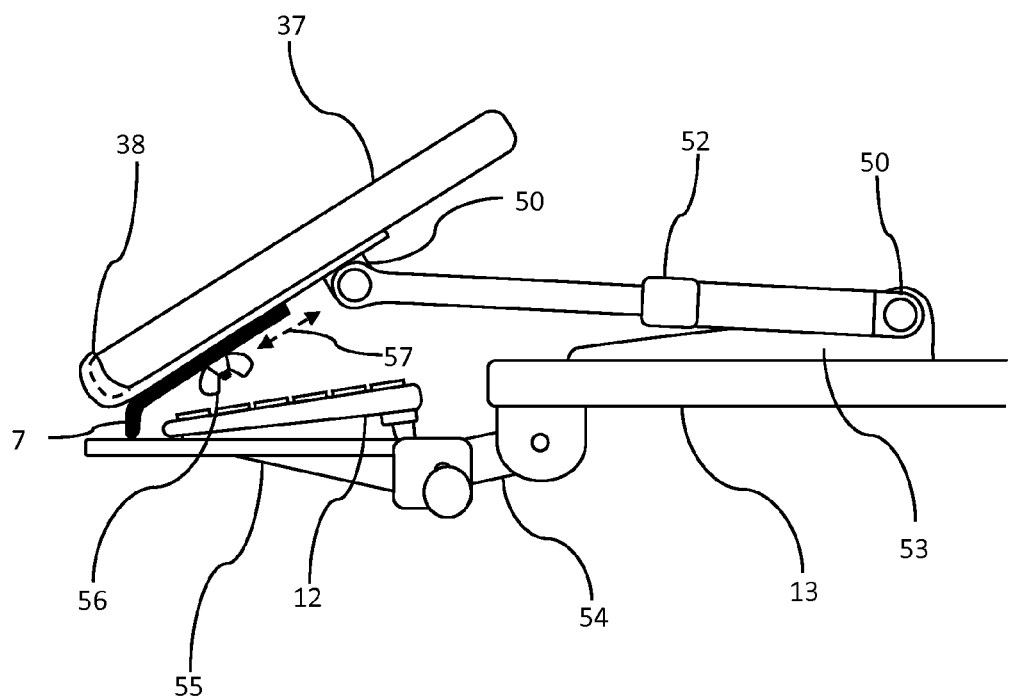
FIG. 3 illustrates another embodiment of a perspective view a telescoping tablet display with sliding foot support.

FIG. 3 shows a sliding footing 7 attached to display mount 38 with telescoping display arm 52. Pivot points 50 of the telescoping display arm 52 may be frictional hinges, detent hinges, spring loaded hinges or any combination thereof. Sliding foot 7 may be adjusted along the path indicated by arrows 57. In one embodiment sliding footing 7 is prevented from sliding by tightening wing nut 56. In other embodiments the footing may be held from sliding by cam locks, magnets or any other means that allows the foot to be adjusted along the length of arrow 57 but held rigidly when in normal use.

Figure 4:
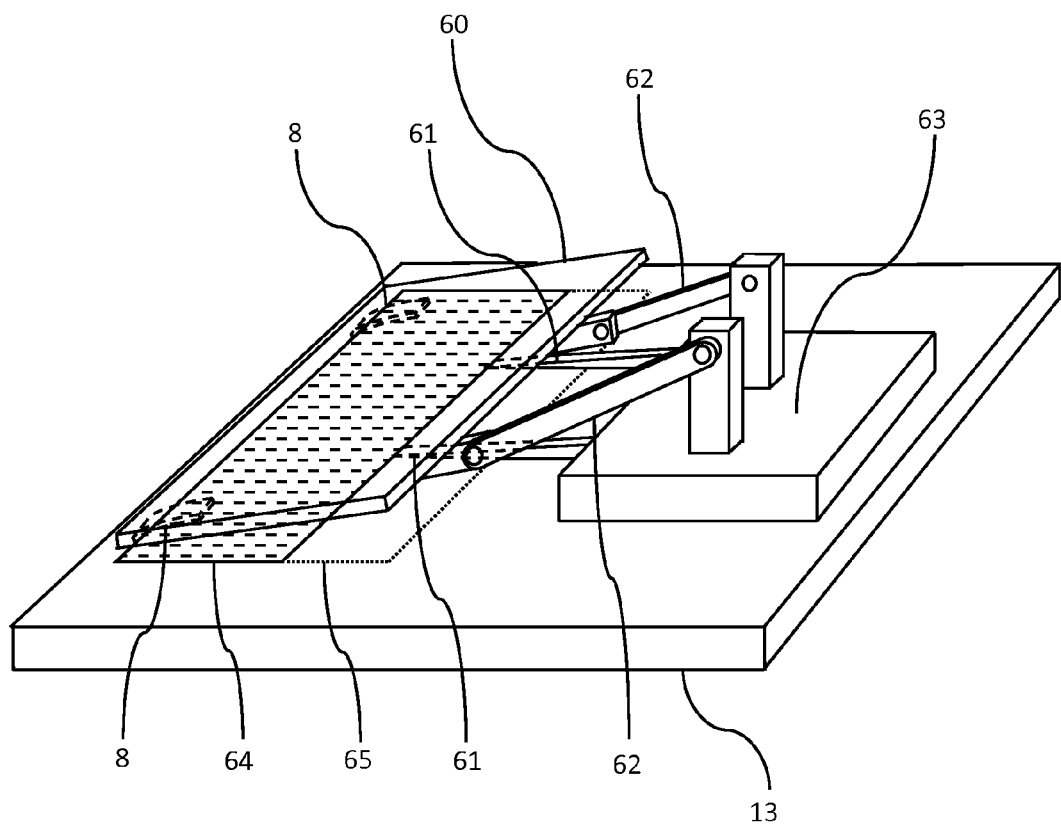
FIG. 4 illustrates another embodiment of a perspective view where base braces extending under the display.

FIG. 4 illustrates oblique perspective view of base 63 with legs 61 are rigidly attached to base 63 and extend under display 60. The function of the legs 61 is to prevent base 63 from topping when display 60 is lowered to a horizontal position. Feet 8 elevate display 60 to allow for an open space 64 below display 60 for storage a keyboard, mouse and the like. The non-open space under the display 65 is not as useful as open space 64 because elements of the base can obstruct the usage of keyboard, mouse and the like. Feet 8 provide support for the display 60 such that touch input on the display 60 should not cause the base 63 to topple.

The above specification, examples, and data provide a complete description of the manufacture and use of the composition various embodiments. Since many embodiments of the invention can be made without departing from the spirit and scope of the invention, the invention resides in the claims hereinafter appended.

What is claimed as new and desired to be protected by Letters Patent of the United States is:

1. A support footing assembly for use with a computer display device, comprising:
    a base;
    at least one arm having a first end and a second end, the first end being pivotally connected to the computer display device, and the second end being pivotally connected to the base; and
    at least one footing being coupled to a side of the computer display device that is opposite to a screen display portion of the computer display device, such that when the computer display device is in a horizontal position, more than half of a surface of the computer display device extends beyond the base creating an open space under the computer display device such that the at least one footing is enabled to contact a surface in an area under about the computer display device to provide stabilization and elevation of the computer display device above the surface and to provide the open space below the display for placement of low profile items including at least a keyboard.

2. The support footing assembly of claim 1, wherein the pivot point between the second end of the display arm and the computer display device is located above a horizontal center of the display device as measured when the display device surface is parallel to a force of gravity.

3. The support footing assembly of claim 1, wherein the at least one footing includes one or more footing housings and one or more foldable feet per footing housing, the foldable feet being capable of being unfolded from the respective footing housing such that the open space is increased under the display device when the unfolded feet contact the surface below the display device.

4. The support footing assembly of claim 1, wherein the at least one footing is detachable from and is capable of being attached to a different location on the display device.

5. The support footing assembly of claim 1, wherein the at least one footing is configured to slide on the back of the display device and is configured to be held or released by a locking mechanism for placing the footing along a slide path.

6. The support footing assembly of claim 1, wherein the at least one arm includes a telescoping arm.

7. The support footing assembly of claim 1, wherein at least one footing is a sliding footing that is configured from sliding or enabled to slide through a use of at least one of a wing nut, nut, cam lock, or a magnet.

8. An apparatus for use with a computer display device, comprising:
    a base;
    at least one arm having a first end and a second end, the first end being pivotally connected to the computer display device, and the second end being pivotally connected to the base; and
    at least one footing being coupled to a side of the computer display device that is opposite to a screen display portion of the computer display device, such that when the computer display device is in a horizontal position, more than half of a surface of the computer display device extends beyond the base creating an open space under the computer display device such that the at least one footing is enabled to contact a surface in an area under about the computer display device to provide stabilization and elevation of the computer display device above the surface and to provide the open space below the display for placement of low profile items including at least a keyboard.

9. The apparatus of claim 8, wherein the pivot point between the second end of the display arm and the computer display device is located above a horizontal center of the display device as measured when the display device surface is parallel to a force of gravity.

10. The apparatus of claim 8, wherein the at least one footing includes one or more footing housings and one or more foldable feet per footing housing, the foldable feet being capable of being unfolded from the respective footing housing such that the open space is increased under the display device when the unfolded feet contact the surface below the display device.

11. The apparatus of claim 8, wherein the at least one footing is detachable from and is capable of being attached to a different location on the display device.

12. The apparatus of claim 8, wherein the at least one footing is configured to slide on the back of the display device and is configured to be held or released by a locking mechanism for placing the footing along a slide path.

13. The apparatus of claim 8, wherein at least one footing is a sliding footing that is configured from sliding or enabled to slide through a use of at least one of a nut, cam lock, or a magnet.

14. The apparatus of claim 8, wherein the at least one footing is electromechanically operable for selecting at least one pre-programmed display positioning.

15. A method of constructing an apparatus useable with a computer display device, the method comprising:
    constructing a base assembly by pivotally connecting at least one arm having a first end and a second end, the second end being pivotally connected to the base, and a first end of the at least one arm being pivotally connected to the computer display device; and
    coupling at least one footing to a side of the computer display device that is opposite to a screen display portion of the computer display device, such that when the computer display device is in a horizontal position, more than half of a surface of the computer display device extends beyond the base creating an open space under the computer display device such that the at least one footing is enabled to contact a surface in an area under about the computer display device to provide stabilization and elevation of the computer display device above the surface and to provide the open space below the display for placement of low profile items including at least a keyboard.

16. The method of claim 15, wherein the method further comprising:
    positioning the pivot point between the second end of the display arm and the computer display device such that the pivot point is located above a horizontal center of the display device as measured when the display device surface is parallel to a force of gravity.

17. The method of claim 15, wherein the method further comprising:
- configuring the at least one footing to include one or more footing housings and one or more foldable feet per footing housing, the foldable feet being capable of being unfolded from the respective footing housing such that the open space is increased under the display device when the unfolded feet contact the surface below the display device.

18. The method of claim 15, wherein the method further comprising:
- configuring the at least one footing to be detachable from and capable of being attached to a different location on the display device.

19. The method of claim 15, wherein the method further comprising:
- configuring the at least one footing to slide on the back of the display device and to be held or released by a locking mechanism for placing the footing along a slide path.

20. The method of claim 15, wherein the method further comprising:
- configuring the at least one footing to be electromechanically operable for selecting at least one pre-programmed display positioning.

* * * * *